June 15, 1954
E. W. GRAHAM
2,681,155
FILTER
Filed Oct. 17, 1944
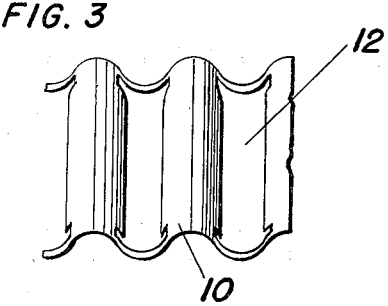
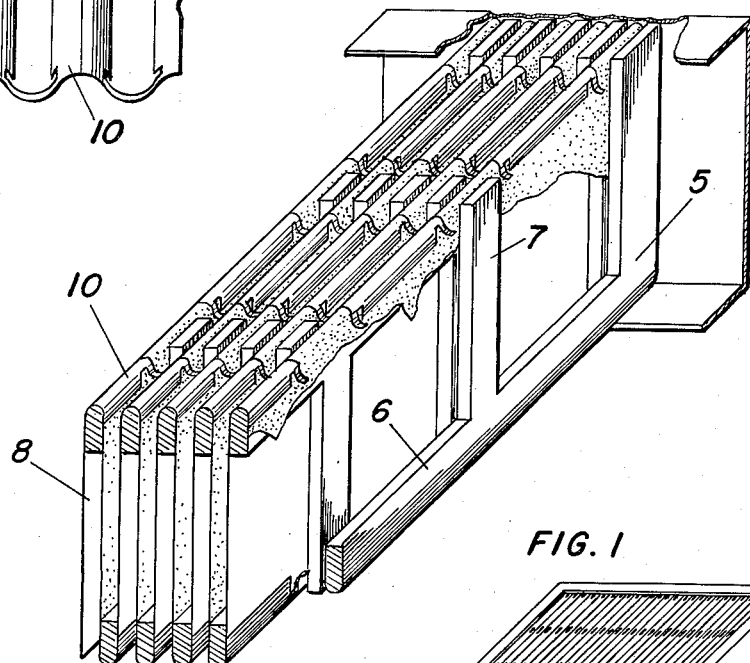
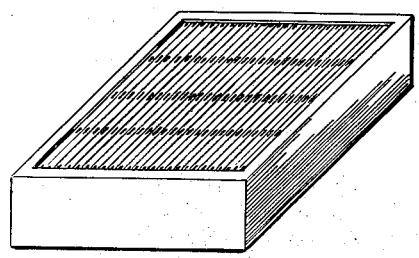
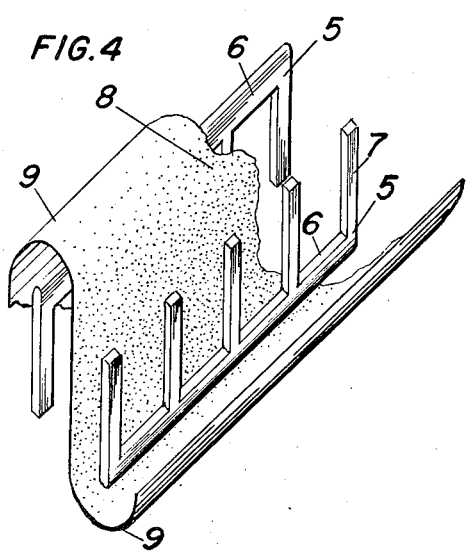
Inventor
EARL W. GRAHAM
By Fred S. Lockwood and Henry Berk
Attorneys Patented June 15, 1954

2,681,155

UNITED STATES PATENT OFFICE 2,681,155

FILTER

Earl W. Graham, Detroit, Mich., assignor to the United States of America as represented by the Secretary of War Application October 17, 1944, Serial No. 559,112

2 Claims. (Cl. 210—169)

(Granted under Title 35, U. S. Code (1952), sec. 266)

The invention described herein may be manufactured and used by or for the Government for governmental purposes, without the payment to me of any royalty thereon.

This invention relates to filters useful in the removal of foreign particles from fluids, such as dust or smoke particles from air, foreign particles from fuel oil or lubricating oil, silt or other finely divided material from water, and is particularly adapted to the cleansing of air as a step in the conditioning of air for ventilation purposes.

Fluid filters of the present art may be classified into two types: (1) those in which the stream of fluid to be filtered enters from a direction substantially perpendicular to the face of the filter material; and (2) those in which the stream of fluid to be filtered enters from a direction substantially parallel to the face of the filter material. The invention of this application relates to the second type of fluid filter, namely, that type wherein the flow of fluid to be filtered enters substantially parallel in direction to the face of the filter material or filter medium. In essence, this invention comprises a fluid filter embodying the combination of a continuous layer of filter material, pleated or folded at a number of points, with a number of independent supporting plates recessed in such a manner as to provide channels for the flow fluid to and from the filter material, the supporting plates being alternately reversed in position in such a manner as to furnish structural support for each pleat or fold of the filter material and, at the same time, provide a channel for the entrance of fluid to the filter material on one of its sides and another channel for the passage of fluid from the filter material on the other side, all as more fully described herein.

The filter construction of the present invention offers a number of advantages over the present art, among which are, positive end and side seals, the furnishing of support for the filter material at a number of points, extremely low weight of the supporting structure per unit of filtration area, the provision of a considerably greater filtering area for a given fluid stream to be filtered and mechanical simplicity of construction which allows rapid and easy replacement of either the filter material or the supporting structures, as may be required by filtration conditions. The advantage of an increased filtering area for a given fluid flow is considered very important because the resistance to fluid flow through the filter varies in the inverse ratio to the area of flow and, therefore, an increase in filtration area results in a lower pressure drop across the filter while at the same time increasing the effective life of the filter.

The object of my invention, generally stated, is to provide pleated filters wherein a maximum filter area in contained in a minimum space with positive end and side seals.

An essential feature in fulfilling this object to a high degree is the use of a novel form of spacer plate comprising a longitudinal section with prong sections extending therefrom so as to form a chain of U-shaped spacer sections.

Other objects of the invention will in part be obvious, and will in part appear hereinafter. For a more complete understanding of the nature and scope of my invention, reference may be had to the following detailed description thereof taken in conjunction with the accompanying drawing in which:

Fig. 1 is a perspective view showing a complete filter unit forming one embodiment of my invention;

Fig. 2 is an enlarged, perspective, fragmentary, sectional view of a portion of the filter shown in Figure 1;

Fig. 3 is an enlarged perspective view showing the clip means utilized for retaining the pleated filter material in place in the construction shown in Figures 1 and 2; and Fig. 4 is an enlarged perspective view illustrating the manner in which the pleated filter medium of the construction shown in Figures 1 and 2 is supported by the spacer plates.

Referring to Figures 2 and 4, it will be noted that the filter material supporting structures or forks 5 consist of a common bar or crosspiece 6 from which separate supporting fingers or prongs 7 project at right angles. The continuous bar or crosspiece portion 6 of the structure furnishes continuous support for the filter material 8 along the pleats or folds 9 while the separate supporting fingers 7 furnish lateral support for the filter material 8 therebetween. The space or recess between the adjacent fingers 7 of any single supporting structure 5 is open and constitutes the channel for fluid flow to and from the filter material 8. The filter material 8 consists of a flexible mass of intermingled fibers, the mass providing a multitude of fine, throughgoing openings which effectively cleanse the fluid in its passage through the openings of the foreign particles contained therein. The filter material 8 may be made of cellulosic materials such as paper pulp filters or cotton linters, or glass or other vitreous fibers or solid threads of polymeric substances depending upon the characteristics desired. The supporting structures 5 may be fabricated from paper board, plywood, solid metal or a built up hollow metal structure, or a solid plastic material, depending upon the requirements imposed by the material to be filtered. As shown in Figures 2 and 4 all supporting structures 5 may be substantially identical in construction, alternate supporting structures being reversed in position so that the solid continuous bar portions 6 are in contact with and furnish support for the long pleat or fold portions 9 of the filter medium. The forks are so formed, for example of flat sheet material, that the corresponding surfaces of the bar and prongs lie substantially in a single plane. By reason of this fact, and the fact that the forks are substantially identical in construction, the prongs of adjacent forks lie throughout their lengths in face-to-face relationship and hold the sheet of filter material between them. The thickness of the supporting structures 5 may vary widely depending upon filtration requirements, varying from one-twentieth of an inch to several inches, depending upon the extent of free area desired for the flow of fluid to each particular face of filter material.

A series of parallel channels is formed by prongs 7 and the adjacent walls of the pleats. Referring to Figure 2, the fluid enters one direction, for example downwardly, into the channels formed in alternate pleats, passes through the filter material and discharges in the same direction from the channels formed in the adjacent pleats.

Figure 3 illustrates a section of a design of a continuous, accurate type retaining clip 10 useful for securing the filter material 8 to the supporting structures 5. The method of application of the clip 10 is shown in Figure 2 while the detailed construction of clip 10 is shown to better advantage in Figure 3. The function of these clips 10 is to secure the filter material 8 to the supporting structures 5 at the pleats or folds 9, insuring, by their conformation to the arc of the pleats or folds 9, tight and positive adherence of the filter material 8 to the supporting structures 5 and the elimination of folds or wrinkles in the vertical faces of the filter material 8 exposed to the flow of fluids. An additional function of the clips 10 is to protect the filter material 8 from physical injury and wear at the pleat or fold surfaces. The long slot openings, designated 12 in Figure 3, are the passages thru which the fluid enters or leaves the composite filter. Retaining clips may be used on one side or both sides of the composite filter as desired or they may be dispensed with altogether. Other forms of retaining structure may be used instead of the design shown. For instance, a length of metal screen so corrugated as to have its corrugations fit the alternate supporting structures along the pleats or folds would be satisfactory.

In assembling the composite pleated filter of this invention into a compact unit, any number of folds separated by supporting structures may be utilized as is deemed necessary to secure the filtration desired. The last supporting structures of any composite filter may be solid plates which furnish a solid fluid tight closure for the sides of the composite unit. The various components of the composite filter may be secured together by tightly clamping the outside supporting structures, as with a modification of the retaining clip of Figure 3, or individual supporting structures may be securely fastened to the continuous strip of filter material by a suitable adhesive material applied to one or both sides of each supporting structure. Or it may be desirable to encase the entire composite filter in a solid, fluid tight outside frame such as shown in Figure 1. To prevent the side leakage of fluids between the ends of the supporting structures and the filter material it is desirable to completely coat the ends of the assembled composite filters with a suitable sealing compound impervious to the particular fluid being filtered, among which certain resinous materials, rubber cements, asphalts or varnishes are satisfactory.

Since certain further changes may be made in the foregoing constructions, and different embodiments of the invention may be made without departing from the scope thereof, it is intended that all matter described hereinbefore or shown in the accompanying drawings be interpreted as illustrative and not in a limiting sense.

I claim:

1. A filter comprising a sheet of filter material folded to form a series of transverse pleats of substantially uniform size; supporting structure arranged to provide a series of parallel channels for the entrance of fluid in one direction along one side of said sheet and for the exit of fluid in the same direction along the other side of said sheet; said structure including a series of separate substantially identical spacer forks on each side of said sheet, each of said forks comprising a transverse cross-bar provided with a row of equally spaced parallel prongs perpendicular to said bar, one prong being located adjacent each end of said bar and at least one prong intermediate the ends, said bar and prongs having surfaces lying substantially in a single plane, said forks being positioned within the pleats with a crossbar supporting the underside of the apex area of each pleat, and retaining means holding said pleats and forks tightly together so that prongs of adjacent forks lie throughout their lengths in face-to-face relationship, the sheet of filter material being held between them.

2. A device as defined in claim 1 wherein said retaining means comprises clips, each of said clips comprising arcuate strips, each of said strips covering the top of the apex area of one of said pleats between two of said prongs, said clips being so formed as to permit flow of fluid between successive pleats.

References Cited in the file of this patent

UNITED STATES PATENTS

| Number | Name | Date |
|---|---|---|
| 2,058,669 | Dollinger | Oct. 27, 1936 |
| 2,071,806 | Walker | Feb. 23, 1937 |
| 2,080,154 | Strindberg | May 11, 1937 |
| 2,135,863 | Walker | Nov. 8, 1938 |
| 2,322,548 | Sigmund | June 22, 1943 |

FOREIGN PATENTS

| Number | Country | Date |
|---|---|---|
| 401,287 | Great Britain | Oct. 30, 1933 |